Patented Apr. 11, 1950

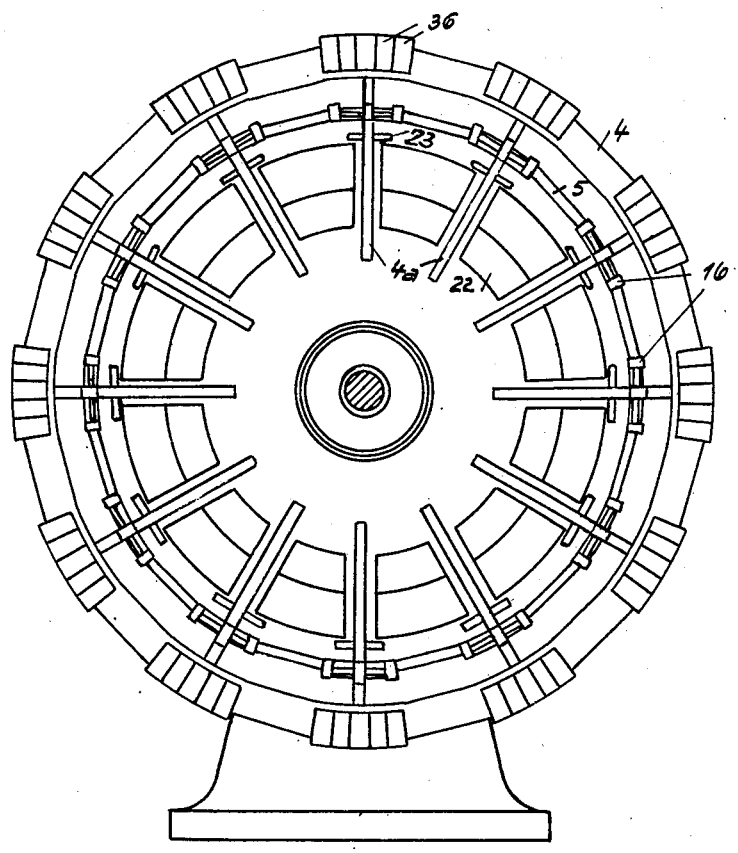

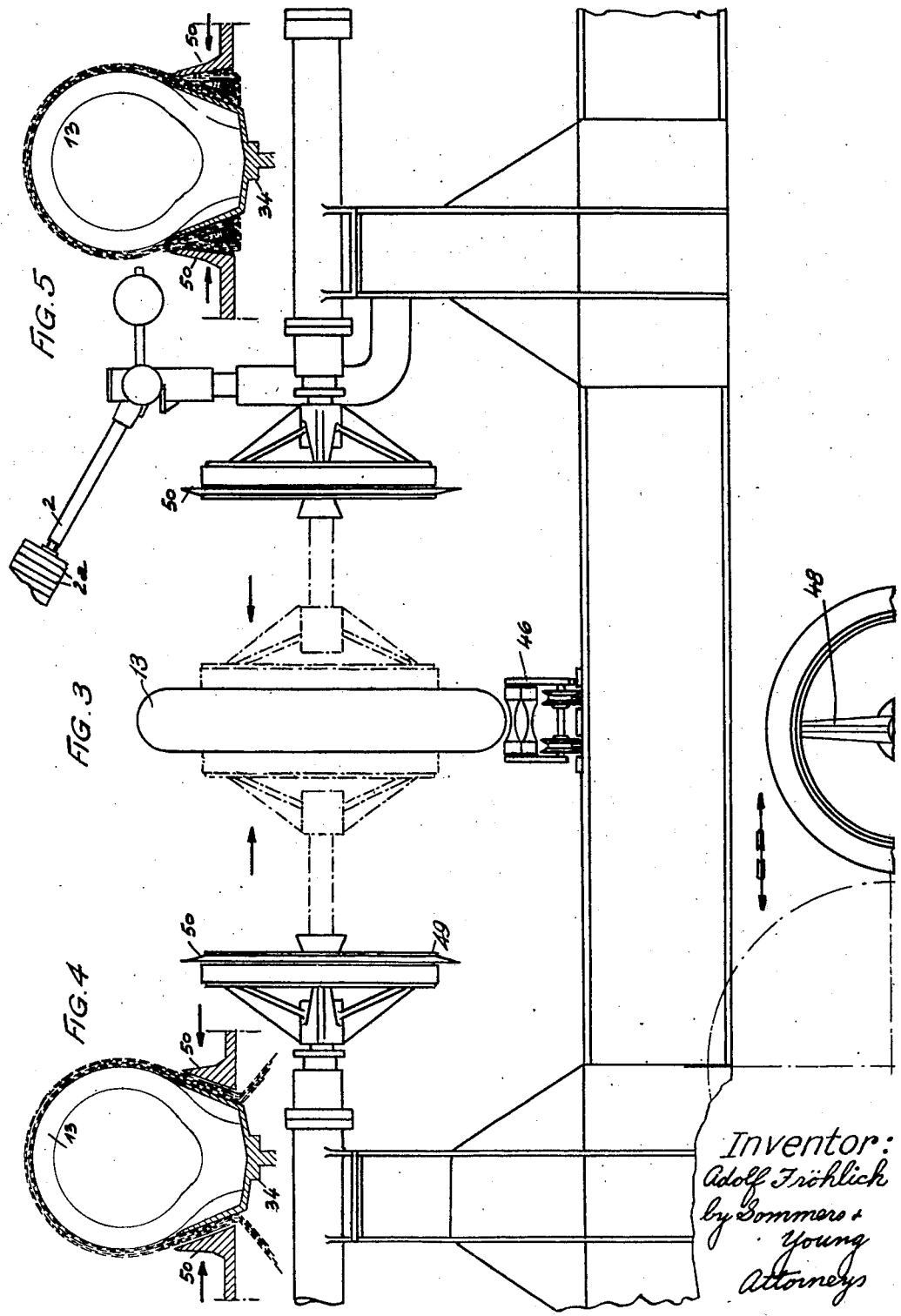

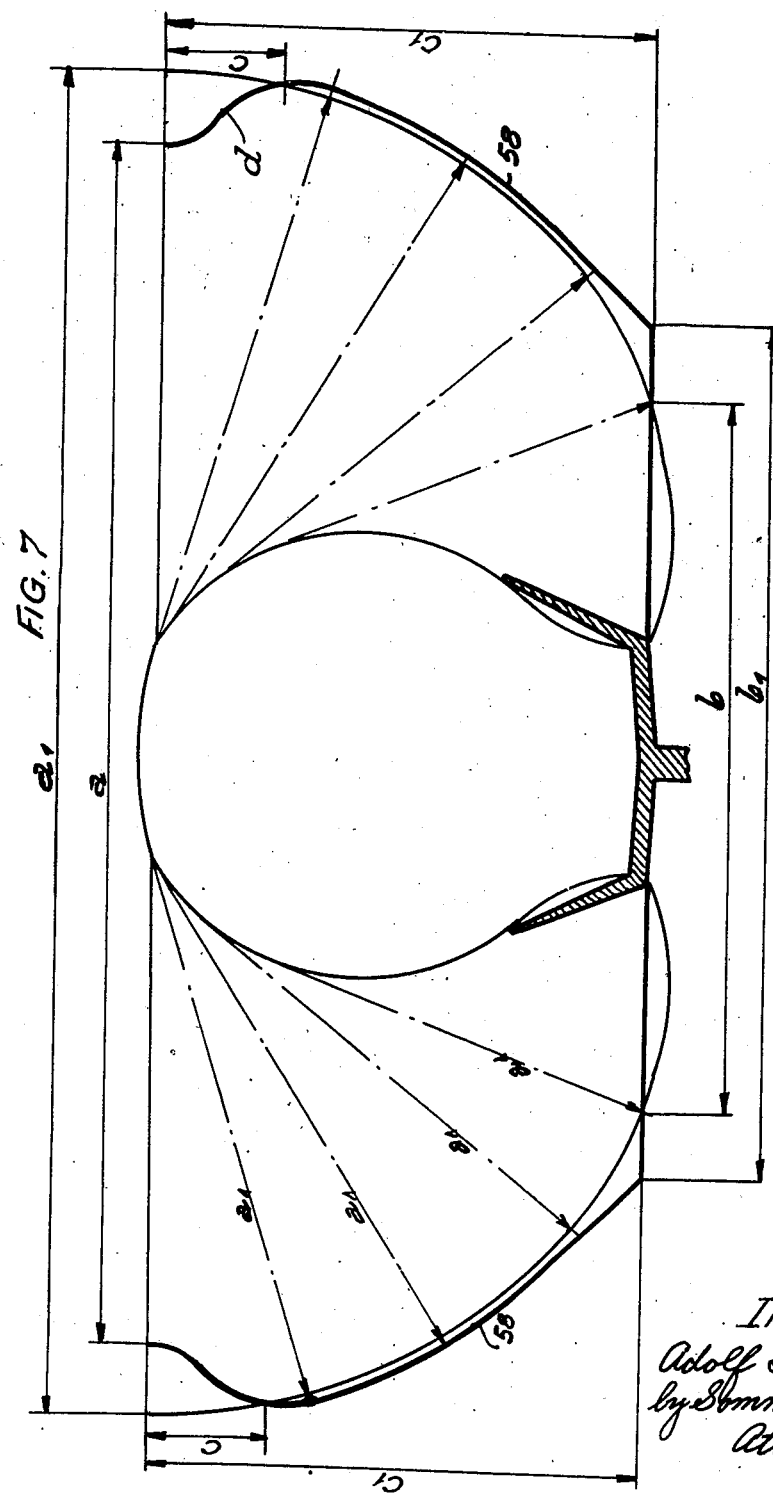

2,503,815

UNITED STATES PATENT OFFICE 2,503,815

PNEUMATIC TIRE MAKING MACHINE

Adolf Fröhlich, Balsthal, Switzerland, assignor to Gesellschaft der Ludw. von Roll'schen Eisenwerke A. G., Gerlafingen, Switzerland Application May 5, 1948, Serial No. 25,272
In Switzerland September 17, 1947

14 Claims. (Cl. 154—10)

My present invention relates to improvements in pneumatic tire making in general and in particular in building up the tire fabric-structure prior to vulcanizing in combination with stretching the superposed cord-webs in the course of mounting same, and the objects of my improvements are first to provide means which permit of stretching the superposed webs uniformly and without undue strain, over the entire core circumference inclusive of the beads, second to afford facilities to prevent the superposed webs from folding, crumpling or crimping when being mounted in place on the annular core or heating tube respectively, and third to design a rigging or tackle for transferring the superposed webs in their correct position relative to the center line of the said core or tube.

Figure 1A:
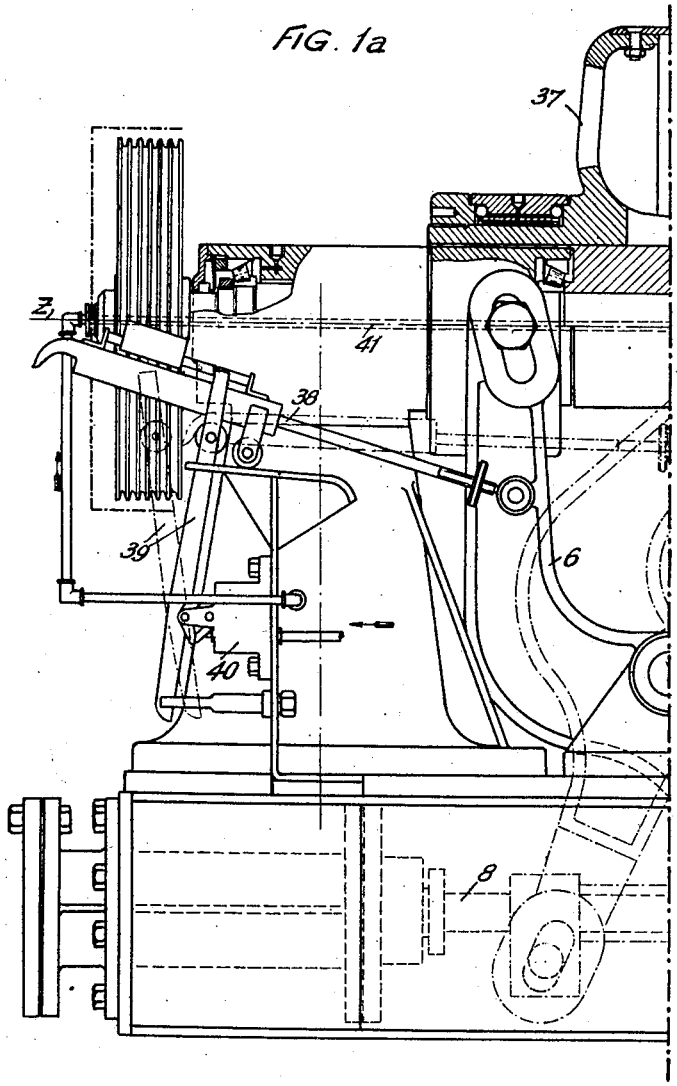
Figure 1B:
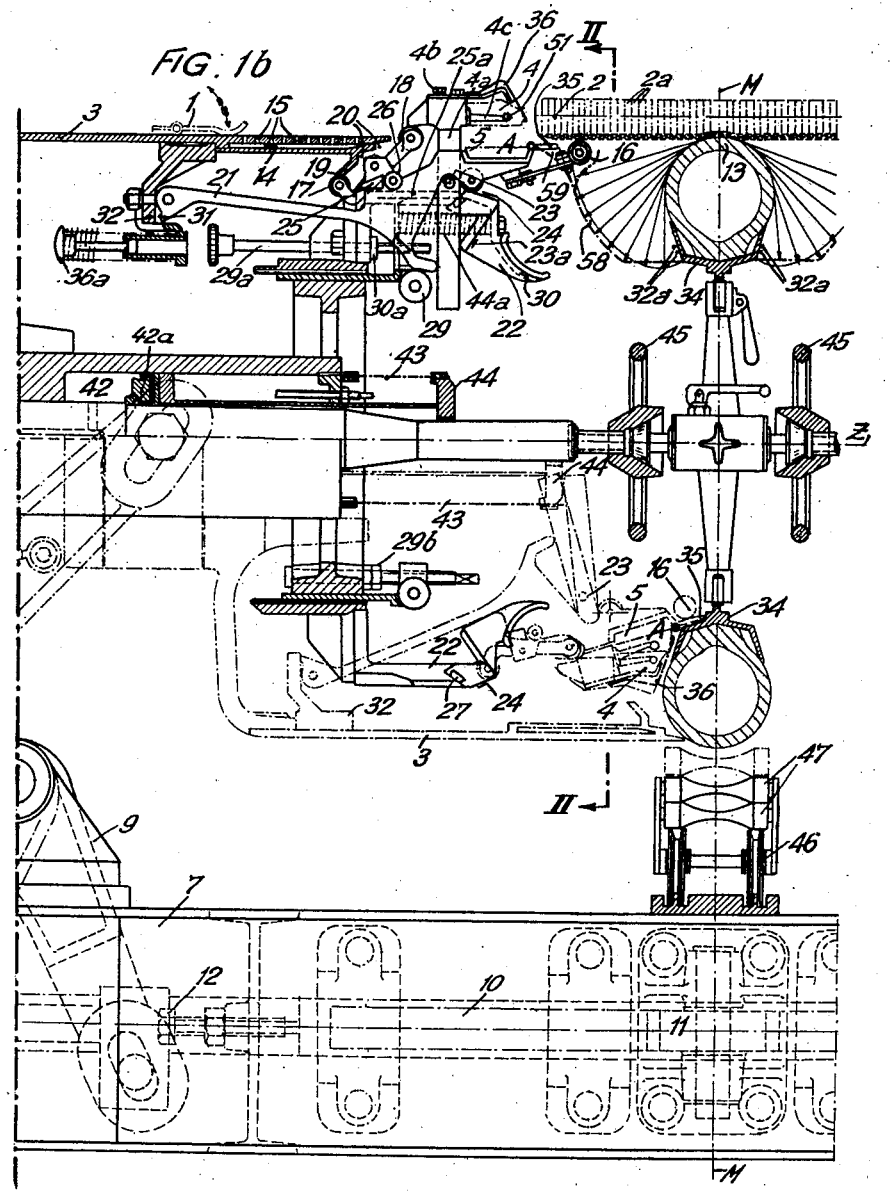

I attain these and related objects by the fabric-structure building-method disclosed by means of a single structural embodiment of the appurtenant tire-building machine which also forms part of my present invention and is shown in the accompanying drawings, in which Figs. 1a and 1b show the left hand half of the machine (which is symmetrical with respect to the center line of the tire to be built) in side view and partly in longitudinal section, Fig. 2 is a front elevation of the web nipper and stretcher rigging on line II—II of Fig. 1, Fig. 3 a side view of the bead setting and pressing gear which enters into operation toward the end of the fabric structure building operation.

Figure 6:
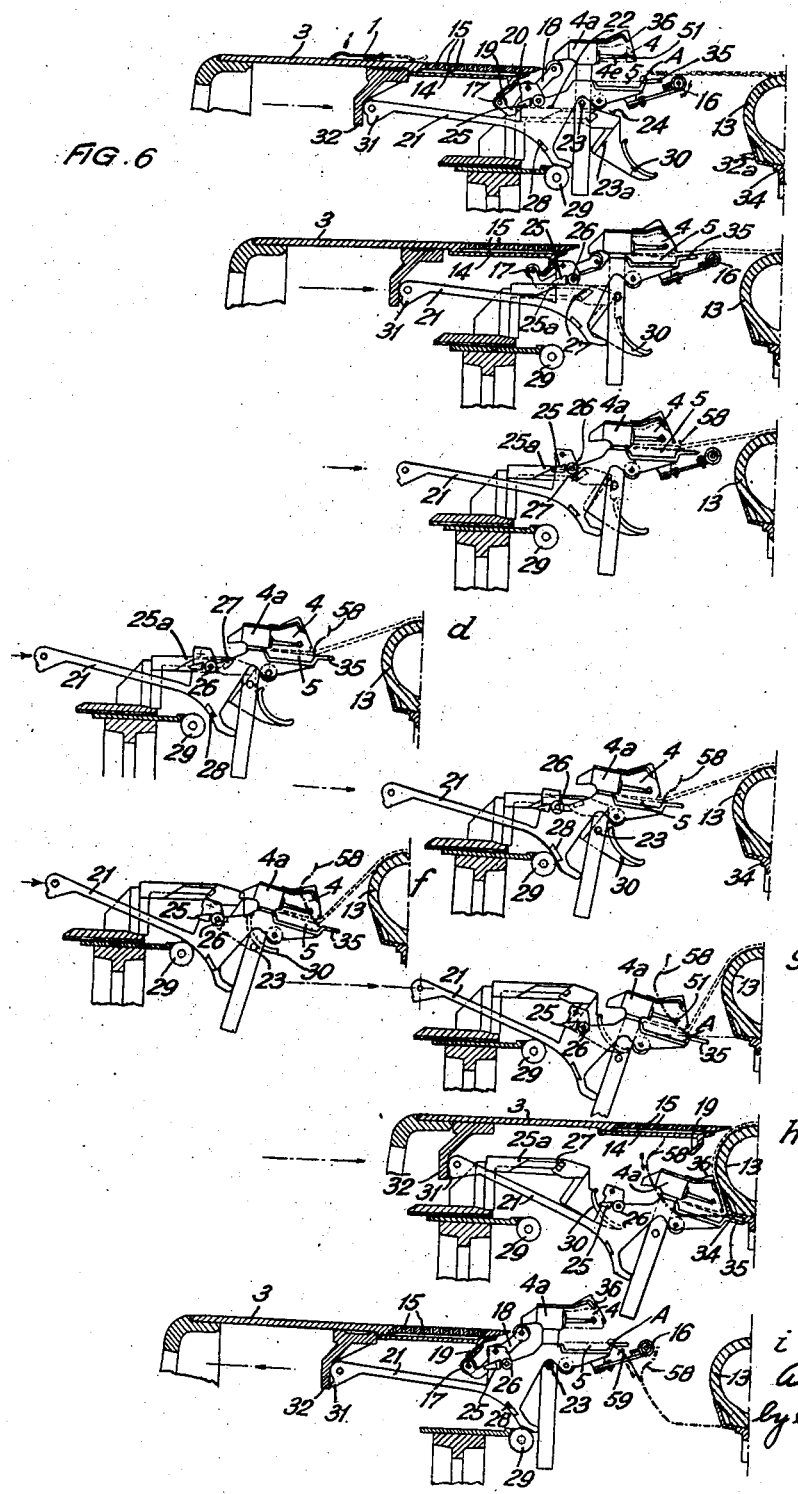

Fig. 4 the working of the superposed webs at the beads in a side view, partly in section, Fig. 5 the superposed webs built up into the bead, in a view similar to Fig. 4, Fig. 6 (comprising partial cross-sections a—i through the upper portion of the left hand web-handling rigging or, respectively, side views of a web nipper-and-stretcher unit) illustrates consecutive operating stages in building up the fabric-structure, the bottommost Fig. i corresponding to the topmost Fig. a, and Fig. 7 the curve described by two opposite web nipper-and-stretcher units (i. e. on the left and right of the machine) in mounting the superposed fabric webs onto the central core or heating tube, or respectively, the consecutive positions or developments of the superposed webs during the building of the tire fabric-structure.

In Fig. 1, M—M is the axis of symmetry of the machine of the fabric-structure, and of the tire to be built. Figs. 1a and 1b, therefore, only show the left hand half of the machine, and only the left hand horizontally displaceable web winding and web transferring drum 3. In the upper left hand portion of Fig. 1b, drum 3 is shown in the retracted or open position, and in the center portion (in dash and dot lines) in the advanced or closed position. The two drums 3 have substantially the same diameter as the annular core structure or heating tube 13 on which the tire is built up. In the closed position of the drums 3, the first fabric web W payed out onto the latter from a swing bracket (not shown), is laterally held down on the drum surface by means of the swing arms 1 so that, when the drums subsequently are rotated, the web is wound thereonto and prevented from sliding off. When winding the other webs (of which there may be four, for example) on top of the first one the arms 1 are swung off the first web and the smoother 2 is swung down from its inoperative position (Fig. 5) into the operative position (Fig. 1b). The elastic stretching-tapes 4, 5 are mounted on the grippers 36, 35 respectively, 4 being the outer and 5 the inner tape. The grippers 36, 35 are circularly disposed about the center-line: Z—Z (Figs. 1a, 1b) of the mechanism which is shown in Fig. 2. In the example shown, twelve such grippers each are uniformly spaced over the circumference. The said two stretching tapes may comprise a plurality of circular adjacent tapes. The cord webs of the carcass are engaged (Figs. 1 and 6) by the grippers 36 and 35 or, respectively, by the elastic stretching tapes 4 and 5, radially and centrically stretched, and mechanically applied, down to the bead of the tire, to the circular core 13 by uniform and sparing minimum elongation without causing folds, ruffles or crimps. The grippers perform a retracting curvilinear movement, whereby the seized ends of the cord webs pass along a curve 58 (Figs. 1 and 6) the shape of which may be adjusted. The said movement of the grippers is built up by the cooperation of the reciprocatable two-part drum 3 and a linkage which comprises arms 21. Two rollers 26 each, co-acting with an inclined sliding face 27, are mounted on both sides of the arms 21. During the said movement, the cord webs are drawn up relatively tight during retraction. The arms 21 are supported on their underside on the adjustable stationary guide rolls 29. Levers 18 are fulcrumed on the arms 21, the grippers 35 of which latter carry the inner elastic stretching tape 5. The arms of the levers 18 are equal and carry a roller at each end. One of these rollers 17, is engaged by an abutment 19 of drum 3, and the other roller biases its appurtenant gripper 36, thereby raising the outer stretching tape 4 from the inner stretching tape 5 at the beginning of the manufacturing process (Figs. 1b, 6a and 6i).

The mode of operation and the further arrangement of the apparatus are as follows:

The first cord web payed out from a swing bracket (not shown) onto the two-part building drum 3, is seized on either side by the fabric holders 1 pivoted to the periphery of the drum 3. When the latter then is rotated, the cord is prevented from sliding off from the drum. When the other cord webs "under the bead" are payed out onto drum 3, the smoother 2 is swung downward and smoothes the webs so as to remove any air bubbles therefrom and to slightly roll same down. Smoother 2 comprises a plurality of roller discs 2a which are provided with longitudinal slots and juxtaposed on a rod so that they may adjust themselves radially with respect to the central axis Z—Z, of the apparatus and independently of each other. When the machine then is opened, i. e. the two drums 3 moved away from each other, the outer stretching tape 4 is moved away from the inner stretching tape 5 (Figs. 1, 6a and 6i). Such opening movement is brought about by means of two main levers 6 mounted to the right and left of the axis M—M (axis of symmetry of the apparatus). The levers 6 are rocked on their bearings 9 by means of two hydraulically actuated plungers 8 secured horizontal in the bed plate 7. The plunger rods 10 are adapted as racks and are interconnected by virtue of engaging a common pinion 11, thus ensuring a positive and uniform operation of the apparatus on both sides thereof. The opening width of the machine or, respectively, the maximum spacing of the two drums 3 is limited by the adjustable abutment studs 12. In order that, upon retracting the drums, the cord webs built up on drum 3 will not be drawn off the crown of the circular core or heating tube 13 to one side or the other, compressed-air chambers 14 are provided on the inside of drum 3, from which radial bores 15 extend to the surface of the drum. Compressed air, therefore, flows between the cord and the drum, and the cord thus floats on a layer of air.

The cord "under the bead," rolled down and smoothed by the smoother 2, and forming a cylindrical band free of air bubbles, rests, after the machine having opened, on the crown of the circular core or heating tube 13 and on the circular row of rollers 16 which, upon such opening operation, jut forward scissor-like, and, upon closing the machine, are automatically withdrawn. There are twenty-four rollers 16 provided for, which prevent the cylindrical cord webs, which have been smoothed by the smoother, from being upset and deformed when the apparatus as well as the stretching tapes 4 and 5 now are closed. To such end, the rollers 16 are carried forward under the cord edges which are lightly supported thereon. Upon closing the apparatus, the two drums 3 approach each other. The arms 21 which carry the inner stretching tape 5, are provided with lugs 25 which slide on equidistant guide tracks 22, and thus hold the tension of the stretching tape 5 constant, until they become disengaged from the tracks 22. At that moment, the rollers 26 mounted on either side of the arms 21 arrive on the inclined slide track 27 (Fig. 6c). Further levers 4a are mounted on the grippers 36, and are provided with cross-pins 23 which are engaged by the tracks 22 so that the said stretching tapes 4 and 5 are spaced from each other at a certain distance. Guide arcs 30 are provided on the tracks 22, and the said cross-pins 23 are slidingly engaged on the underside of said arcs (Figs. 6d—g). The outer stretching tape 4, by virtue of the cross-pins 23 sliding down the incline 24, approaches the inner stretching tape 5 more and more (Figs. 6a—c) until finally, by virtue of the cross-pins 23 dropping from the incline 24, the outer stretching tape 4 drops blow-like onto the inner stretching tape 5, thus positively gripping the edges of the cord webs (Fig 6c). When the cross-pins 23 are engaged on the underside of the guide arcs 30, the gripping action between the stretching tapes 4 and 5 is still sufficient after the rollers 26 have dropped from the inclined, guiding face 27 (Figs. 6d and e), even though the inherent tension of the tapes 4 and 5 has ceased and the outer stretching tape 4 has finally attained its inside diameter. After the incline 27 has been passed, the rubber bumpers on the curved rear track of the arm 21 drop from a small height onto the guide rollers 29 and the arms 21 roll off the latter (Figs. 6d and e.)

The cord webs, through the above-described curvilinear movement of the arms of their grippers, respectively, now have been stretched smoothly and uniformly to the inside diameter (Fig. 6g) which is held so that the bead-cores fit perfectly. By decreasing the tension on the last portion of the tensing curve 58, the cord webs are slacked again to such extent that they engage the holder 34 of the heating tube or core, respectively, nearly without tension (Fig. 6h). The heating tube, therefore, may become erected and expanded again free of constraint. The fixed definition of the inside diameter is given in that the arms 21 are disposed circularly about the center line Z—Z of the apparatus and guided on the guide-rollers 22, and that the abutment faces 31 abut against the lever holding-ring 32 (Fig. 6h) so that, at the same time, also any sagging of the cord webs is avoided. The cord webs, upon further closing of the machine, are pushed against the flanks of the holder 34 (Fig. 6h) of the heating tube or, respectively, core, which holder is provided with barb-like studs 32a (Fig. 6a). The tongues 35 as well as the leaf springs 36 form, in the closed position of the machine, a smooth closed annual face.

The two drums 3 then are retracted from the position shown in Fig. 6h into the open position of the machine (Figs. 6i and a), the two compressed air valves 40 being opened through the movement of the main levers 6 via spring-loaded riggings 38 and valve levers 39 so that compressed air enters into the cylinder 42 through the bores 41 of the two main shafts. In this way, a piston 42a, which communicates with a pressure-ring 44, is moved against the lower ends of the levers 4a which carry the cross-pins 23, and the outer stretching tape 4 is lifted from the inner stretching tape after the cord webs have been pushed down against the core holder 34.

The slide guide ring, loaded by the spring 44a, and its guide-tracks 22, are pushed back for the width of the gripped cord web edges, when the two drums 3 are retracted, through the cross bores 23 which slide upwardly on the incline 23a. The arms 21, then, may slide freely with their rear tracks 21a on the guide rollers 29 into the wide open position, without spreading the cord when the outer stretching tape 4 rises.

In the upper position of the arms 21 (Figs. 6a—f) the slide guide ring with the guide tracks 22 is released, and is again propelled forward into its working-position against the abutments 30a (Fig. 1) which are adjustable by means of spindle 29a. The said abutments serve for setting the desired opening width of the device. The opening width, which influences the tensing curve 58, is designated by a in Fig. 7. Moreover, the run of the tensing curve itself may be biased by adjusting the spindles 29a (Fig. 1).

Fig. 7 shows the tensing curve 58 of the cord webs in larger scale. The distance $d$ shows the re-entering portion of the curve 58, the set-up of which has been described. The cord webs are gripped over the width $a$, and are stretched to the width $a_1$ on the distance $d$ of curve 58. The ratio of such stretching, for all the cord threads and their materials, i. e. $a_1:a$ is in the order of 1.01:1 up to 1.5:1. In the further run of the tensing curve, down to the inside diameter of the bead sole, one arrives at the width $b$. The latter is stretched to the width $b_1$. The ratio of such stretching, i. e. $b_1:b$, for all tire-building materials, is in the order of 1:0.9 up to 1.5:1. The height of the tensing curve, corresponding to the height of the cross-section of the tire, is $c_1$. The height of the distance $d$ of the re-entering curve portion is $c$. The ratio $c_1:c$ for all the tire building materials is from 1 to 100. The maintenance of the minimum elongation, of course, is essential.

After the machine has been fully opened, the two handwheels 45, which have conical catching hubs running on right hand and, respectively, left hand threads, are turned by both hands so that the tire carcass is supported on the pneumatically operated two-wheel carriage 46 having receiving rollers 47 and may be wheeled into the axis of the pneumatically operated combined bead-setting and pressing device 48 (Fig. 3). The two bead cables have previously been mounted on the resilient bead-setting rings so that the said cables may be set accurately by simple wheeling. The wheels then are turned back approximately for the width of the cord bead fold, the latter folded upward, and the wheels again advanced, whereby the mold pressure rings 50 preliminarily press the bead free of air bubbles and uniformly. The bead-setting and pressing device 48 then is opened by simply manipulating the compressed air valve lever, and the carcass wheeled back into the machine. The latter then is opened by reversing the hydraulic lever.

The mounting of the cord webs over the bead-core, and of the remaining structural parts, is done in a similar simple manner as described.

The rolling and trimming then are done in a manner known, the pneumatic pressures being so tuned as to prevent a "shifting" or displacement. The trimming tool is provided, for protection, with a resilient pressure roller both in front and rear.

The machine, then, is opened, and the cord web edges are seized in the closing operation which immediately follows, and are stretched around radially as described. The machine then is approximately half-opened, and then again closed, the edge or bead portion of the cord webs being folded inwardly through the closed circle of the lever-tongues 35. The bead diameter is smoothly formed to the accurate diameter so as to accurately fit the bead rings of the vulcanizing press.

By virtue of the relatively long cross pins 51, which carry the outer stretching tape and nearly touch each other in the closed circle, it became possible to substantially reduce the number of levers in the circumference, down to 12 pieces for example, so that the hardened lugs 25 as well as the rollers 26 on the slide guiding ring with the guide tracks 22 have such a wide support as to afford a positive security against sliding or rolling off.

What I claim as new and desire to secure by Letters Patent is:

1. A machine for fabric-structure building in the manufacture of pneumatic tires, comprising a circular core mounted in the vertical plane of symmetry of the machine on a holder, a pair of co-axial main hollow axles rigidly mounted on either side of the said plane, a drum mounted on each said axle means for axially moving the said drums toward or away from the said core, a piston mounted for pneumatic axial displacement in each said axle, a vertical annular rigging rigidly secured to the core-end of each said axle inside each said drum and projecting from the latter toward the said core, the said two riggings comprising each a plurality of cantilevered arms which provide a plurality of roller-tracks and slideways, a plurality of outside elements disposed rockable and vertically displaceable intermediate of the arms of each said rigging, each of said outside element comprising a radial stem and an arm projecting from the radially outer end toward the said core, a circular outside steel tape carried by the arms of the said outside elements, a plurality of inside elements disposed in a circle intermediate of each said rigging and the arms of said outside elements and traversed by the stems of the latter and, mounted for rocking and longitudinal displacement by means of rollers on the roller-tracks of the said rigging-arms, a circular inside steel tape carried by the said inside elements, and a movable annular sliding-collar disposed inside each of said drums and adapted to be engaged by shoulders thereof; the whole in such combination that the cord webs mounted on the said drums and supported by the said core in the closed position of the drums slide off the latter when the drums are drawn apart, are then gripped between the said tapes, stretched and applied to the said core, by virtue of the timed co-action of the said drums with the said inside and outside elements on one hand, and of the said two pistons with the radially inner end of the stems of the outside elements on the other hand.

2. In a machine set out in claim 1, means adapted to make the said inside and outside elements and tapes perform a retracting curvilinear motion at the start of the cord mounting operation, comprising a pair of parallel rollers mounted on a lever provided for each said inside element, and an inclined roller-track provided on each arm of the said two riggings, the said rollers guiding the said levers and inside elements downwardly on said inclined roller-tracks.

3. In a machine set out in claim 1, means for lifting the outside tape off the inside tape, comprising a two-arm lever pivoted to each said inside element, a roller pivoted to each end of said lever, and an abutment fixed to the inside of each said drum, one of said two rollers co-acting with said abutment, and the other roller co-acting with the arm of each said outside element.

4. In a machine set out in claim 1, means for keeping the tension of the inside tape constant until the cord webs are subjected to an additional stress, comprising a pair of parallel lugs provided on each of said inside elements, a pair of parallel slideways provided on each arm of the said riggings, the said lugs sliding in the said slideways until sliding down the inclined roller-track.

5. In a machine set out in claim 1, means for holding the two said tapes at a certain spacing from each other, comprising a cross-pin secured to the stems of the said outside elements, the said cross-pins abutting against the arms of the said riggings.

6. In a machine set out in claim 1, means for guiding the outside elements during the cord-mounting operation, comprising a cross-pin secured to the stems of the said outside elements, and arcuate guiding flanges provided on the arms of the said two riggings, the said pins sliding on the underside of the said flanges.

7. In a machine set forth in claim 1, a roller-support for each inside element, adapted to be displaced against spring-action relative to the said riggings for the purpose of adjusting the operation characteristics of the said elements.

8. In a machine set out in claim 1, a smoother device pivoted to the machine frame to be swung downward onto the cord webs mounted on the said two drums to smooth out the superposed cords, comprising an arm, and a plurality of roller-discs mounted radially displaceable on the said arm.

9. In a machine set out in claim 1, a pneumatically operated carriage, and a bead-setting and pressing device, the said carriage being adapted to wheel the tire-carcass away from the central axis of the machine and into the axis of the said device.

10. In a machine set out in claim 1, a pair of molding-rings mounted on the bead-setting and pressing device and adapted to pre-mold and settle the flapped-over cord.

11. In a machine set out in claim 1, a mechanism for actuating the said inside elements and said two drums, comprising two main two-arm levers fulcrumed to the machine bed plate and pivoted at one end to the said drum, and two pistons disposed horizontally in the said bed-plate, the other end of said levers being pivoted to said pistons.

12. In a machine set out in claim 11, a piston rod for each said piston and adapted as rack and a single pinion co-acting with the said two racks.

13. In a machine set out in claim 11, compressed-air valves adapted to actuate the said main levers through linkages and valve levers to let compressed air flow through bores into chambers, and two pistons each communicating with a pressure-ring, the said two pistons being moved by the compressed air against the foot-ends of the stems of the said outside elements so as to lift, after pressing the cord webs against the said cord, the outside tape from the inside tape.

14. In a machine set out in claim 1, a compressed-air chamber provided inside each said drum and having bores leading to the drum outside, for the purpose of providing an air-bed for the cord webs mounted on the said drums prior to their transfer to the said inside and outside elements.

ADOLF FRÖHLICH.

REFERENCES CITED

The following references are of record in the file of this patent:

UNITED STATES PATENTS

| Number | Name | Date |
| --- | --- | --- |
| Re. 17,036 | Textorius | July 17, 1928 |
| 1,603,858 | Midgley | Oct. 19, 1926 |
| 1,603,860 | Midgley | Oct. 19, 1926 |
| 1,645,397 | Perrault | Oct. 11, 1927 |
| 2,259,162 | Hirsch et al. | Oct. 14, 1941 |